US006535299B1

(12) United States Patent
Scherz

(10) Patent No.: US 6,535,299 B1
(45) Date of Patent: Mar. 18, 2003

(54) BAR CODE VERIFICATION AND PRINTING SYSTEM

(75) Inventor: Andrew V. Scherz, Huntington Beach, CA (US)

(73) Assignee: Printronix, Inc., Irvine, CA (US)

( * ) Notice: Subject to any disclaimer, the term of this patent is extended or adjusted under 35 U.S.C. 154(b) by 0 days.

(21) Appl. No.: 09/510,849

(22) Filed: Feb. 23, 2000

Related U.S. Application Data

(60) Provisional application No. 60/153,853, filed on Sep. 14, 1999.

(51) Int. Cl.$^7$ .............................................. G06K 15/00
(52) U.S. Cl. ...................................... 358/1.18; 358/1.12
(58) Field of Search ................................ 358/1.1, 1.12, 358/1.6, 1.8, 1.9, 1.2, 1.14, 539, 470; 400/103, 61, 62, 63, 74, 76; 235/462.1; 382/112, 181

(56) References Cited

U.S. PATENT DOCUMENTS

| 4,699,531 A | 10/1987 | Ulinski et al. |
| 4,795,281 A | 1/1989 | Ulinski, Sr. et al. |
| 5,564,841 A | 10/1996 | Austin et al. |
| 6,354,503 B1 | 3/2002 | Chiu |

FOREIGN PATENT DOCUMENTS

| FR | 2754371 | 4/1998 |
| JP | 63007955 | 1/1988 |

*Primary Examiner*—Arthur G. Evans
(74) *Attorney, Agent, or Firm*—George F. Bethel

(57) ABSTRACT

This disclosure sets forth a verifier for verifying the quality of print such as bar codes in combination with a printer wherein the printer can be controlled to provide proper printing functions for printing in response to the verifier input. The printer upon receipt of a particular report from the verifier can stop the printing such as bar code printing as to a bad label, overstrike a bad label, or reprint the label. Further to this extent, the printer can be controlled by operator intervention on the control panel or by automatic input through the controller of the printer to provide for the respective necessary and correct print or bar codes being printed.

31 Claims, 6 Drawing Sheets

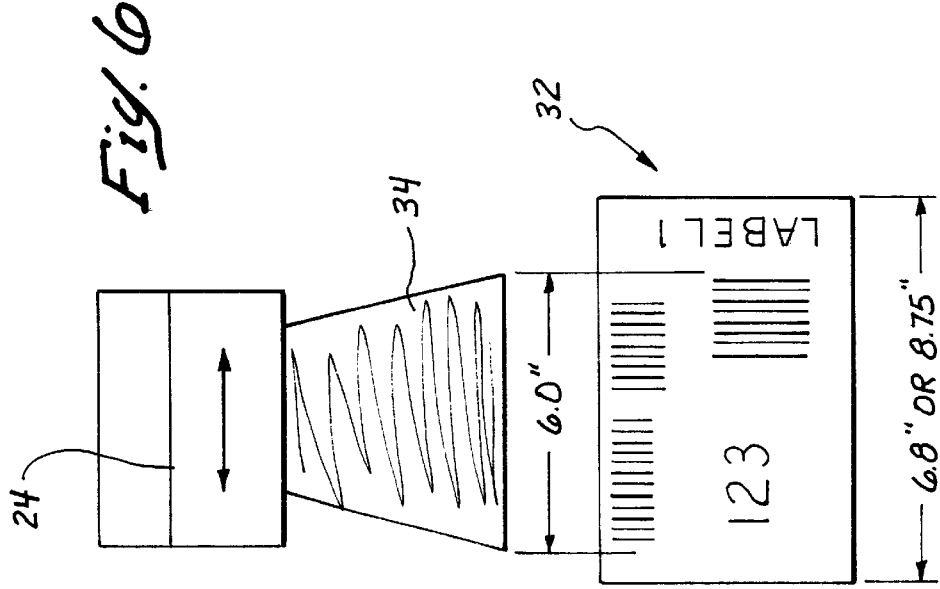
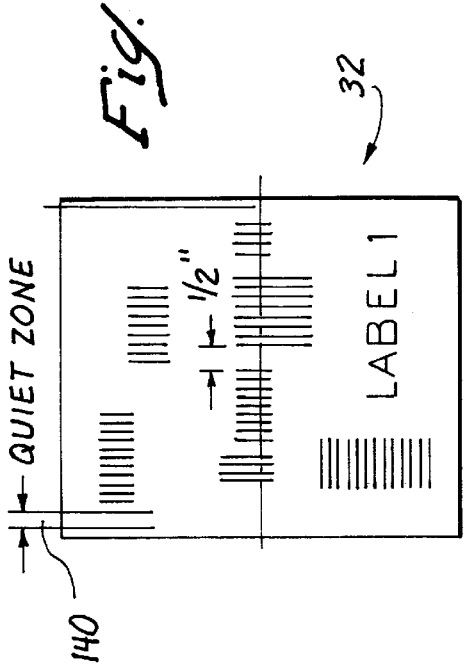
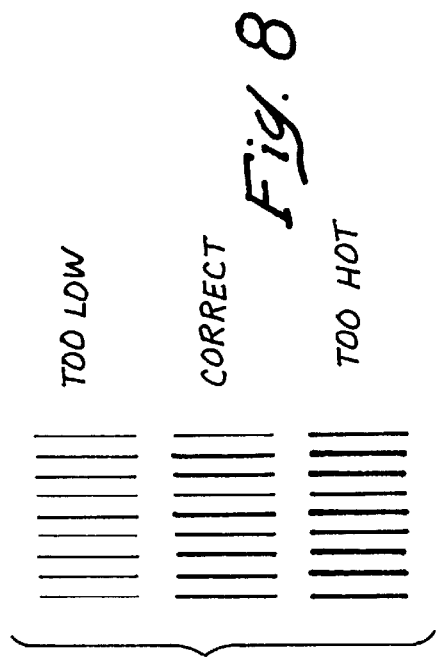

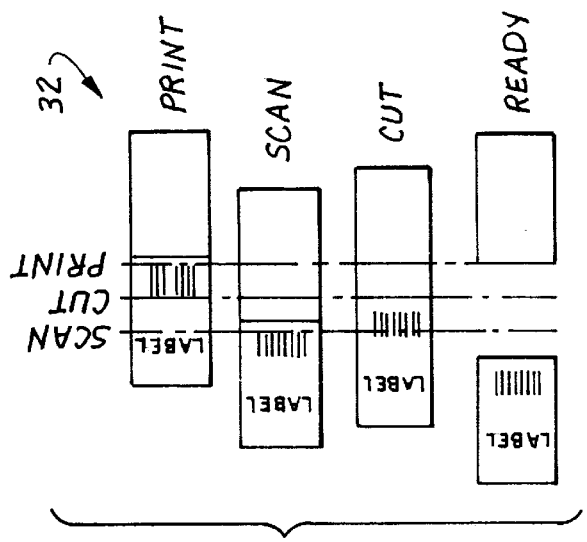
Fig. 9   Fig. 10
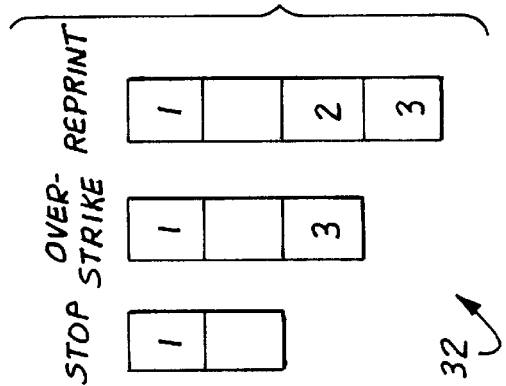
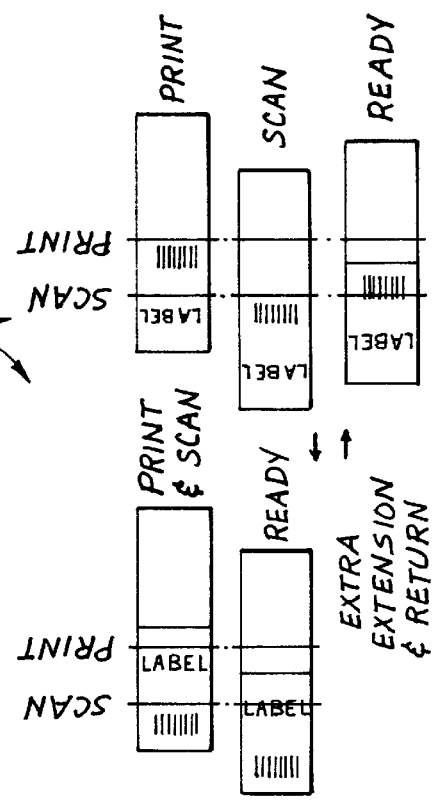
Fig. 11

BAR CODE VERIFICATION AND PRINTING SYSTEM

This application claims the benefit of U.S. Provisional Application Ser. No. 60/153,853 filed Sep. 14, 1999 entitled a BAR CODE VERIFICATION AND PRINTING SYSTEM Inventor Andrew V. Scherz.

Your Petitioner Andrew V. Scherz a citizen of the United States of America and a resident of Orange County in the State of California whose residence and post office address is 17332 Gurney Lane, Huntington Beach, Calif. 92647 prays that letters patent may be granted to him for the invention of a BAR CODE VERIFICATION AND PRINTING SYSTEM set forth in the following Specification.

BACKGROUND OF THE INVENTION

1. Field of the Invention

The field of this invention lies within the bar code reading and printing art. In particular bar codes are utilized for marking and providing information to a scanning device as to the price, quality, specification, model number, and other relevant information for a particular product or service to which the bar code is applied. Bar codes rely upon a critical orientation based upon a specific protocol as to the width, character, and quality of the bars. More specifically, this invention relates to the ability to verify and validate the characterization and quality of a bar code. This invention can particularly relate to thermal printers that are utilized for printing bar codes and the necessity of verifying such bar codes.

2. Background of the Invention and Prior Art

The prior art with regard to verification of bar codes and the scanning of bar codes sometimes falls within the realm of scanning to determine whether or not a bar code can be read. In such cases, scanners can attempt to read a bar code and possibly declare the bar code as being good. However, the verification required for a quality bar code is more than merely a reading of the bar code.

Bar codes have become a significant requirement in the supply chain of goods and services. Compliance with various protocols and the necessity for quality bar codes is required in such a supply of goods.

If such verification is not utilized, the failure of such bar codes that are not properly verified, causes rejected goods, customer imposed fines, delayed payments, administrative over work, and customer dissatisfaction.

Many printers, although supposedly fail safe, can create bad bar codes due to various media or print ribbon problems. Thermal printers should be provided with a validation or verification system due to the fact that wrinkles, dropped dots, and other inconsistencies in the media, printing system or print ribbon require verification.

A further benefit of verification is that it allows a thermal printer to establish the proper heat, speed, and pressure of the print head which cannot necessarily be established by eye. Also, the ratios of bar widths for reliable reading, and the blackness of the print, is a requirement that must be established and cannot be necessarily established by visual means.

A solution to the foregoing problem is provided by this invention so that a turnkey effort without modifications of the host connected to the printer and a nominal amount of time for setup can be established. The setup can choose an error action such as stopping the printer, over striking a printed bar code, or reprinting the bar code. All these features can be controlled by the printer to provide automatic quality control, and reports through an integrated printing network.

The invention hereof examines the bar codes as printed to catch such problems as wrinkles in the print ribbon, media defects, on which the print ribbon print, burned pixels, misaligned media, improper heat at the print head, incorrect speed, or incorrect pressure on the print head during the printing process. The net result is to provide a verification system linked with a thermal printer to optimize print settings.

The invention uses a thermal printer, but can also be adapted for other printers. The invention provides for a verification and overall system that maintains a well verified and inclusive ability to grade and judge a bar code so that it can be effectively read.

SUMMARY OF THE INVENTION

In summation, this invention enables a verification of bar codes in combination with a printer to check on problems including printer ribbon wrinkle, media defects, burned pixels, print head imperfections, misaligned media, improper heat to the print head, improper speed of printing, or improper print head pressure to provide for well established settings and a net result of a more accurate bar code.

More particularly, the invention can incorporate a one pass or fail mode for a code being printed. In doing so it uses such parameters as percent of decode, symbol contrasts, quiet zone maintenance, decodability, deviation and various criteria that can be modified by a user. The invention enables a setting up of a printer with a verifier to establish bar width deviation with a finely tuned adjustment indication by using the steps of printing and various menus to check the bar width deviation and thereafter adjusting the print head heat and speed.

The system has the capability of establishing a proper quiet zone, the picket fence orientation of the bar code, the establishment of space between multiple codes, and the verification of various protocols.

The foregoing features and functions as summarized herein will be described in the following specification setting forth the respective improved features hereof.

BRIEF DESCRIPTION OF THE DRAWINGS

FIG. 6 shows the method of setting up the verifier for proper label review.

FIG. 7 shows the variances that must be established in a bar code label.

FIG. 8 shows variations in bar code quality.

FIG. 9 shows the ability of the thermal printer and verifier of this system as to various treatments of a bar code label that is not properly verified.

FIG. 10 shows the operation of the bar code verifier and printer with respect to a particular label.

FIG. 11 shows the diagrammatic view of a label being printed with an extra extension and return of the label for proper scanning.

DESCRIPTION OF THE PREFERRED EMBODIMENTS

Figure 1:
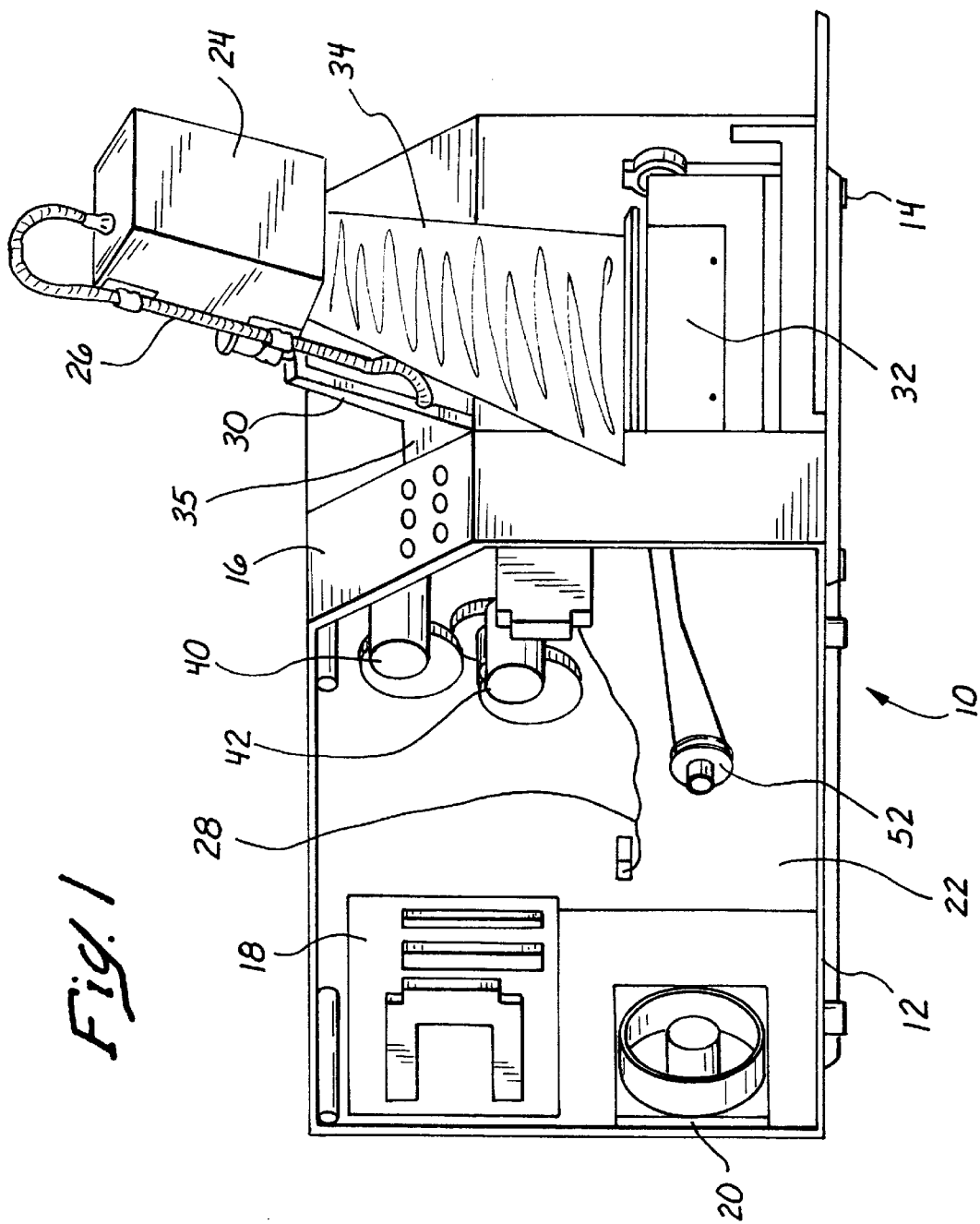
FIG. 1 shows a frontal perspective view of the verifier of this invention mounted to a thermal printer.

FIG. 1 shows a thermal printer 10 having a base portion 12 mounted on legs or feet 14. The thermal printer 10 has a panel 16 with numerous switches and a display in order to provide for various menu selections for the printer.

The thermal printer 10 incorporates a printer controller 18 that is connected to a host. A cooling fan 20 is shown at the rear of the printer. The respective portions shall be detailed in the other figures. Some are shown mounted on a casting forming a wall portion 22 that provides the wall and the support for various portions of the printer on either side.

The printer is shown with a verifier or scanner 24 mounted thereto with a cable 26 connected to the printer controller through a power and serial lead 28. The scanner 24 is mounted on a bracket 30 connected to the casting 22. The scanner 24 can be moved across the width of the label on the media that is to be printed namely label 32 that has emanated from the printing process.

A scanning beam 34 is shown that scans the width of the label 32 for bar code verification. This scanning beam 34 can be oriented with respect to the bar code that has been printed on the label 32 by movement in the bracket 30.

Figure 3:
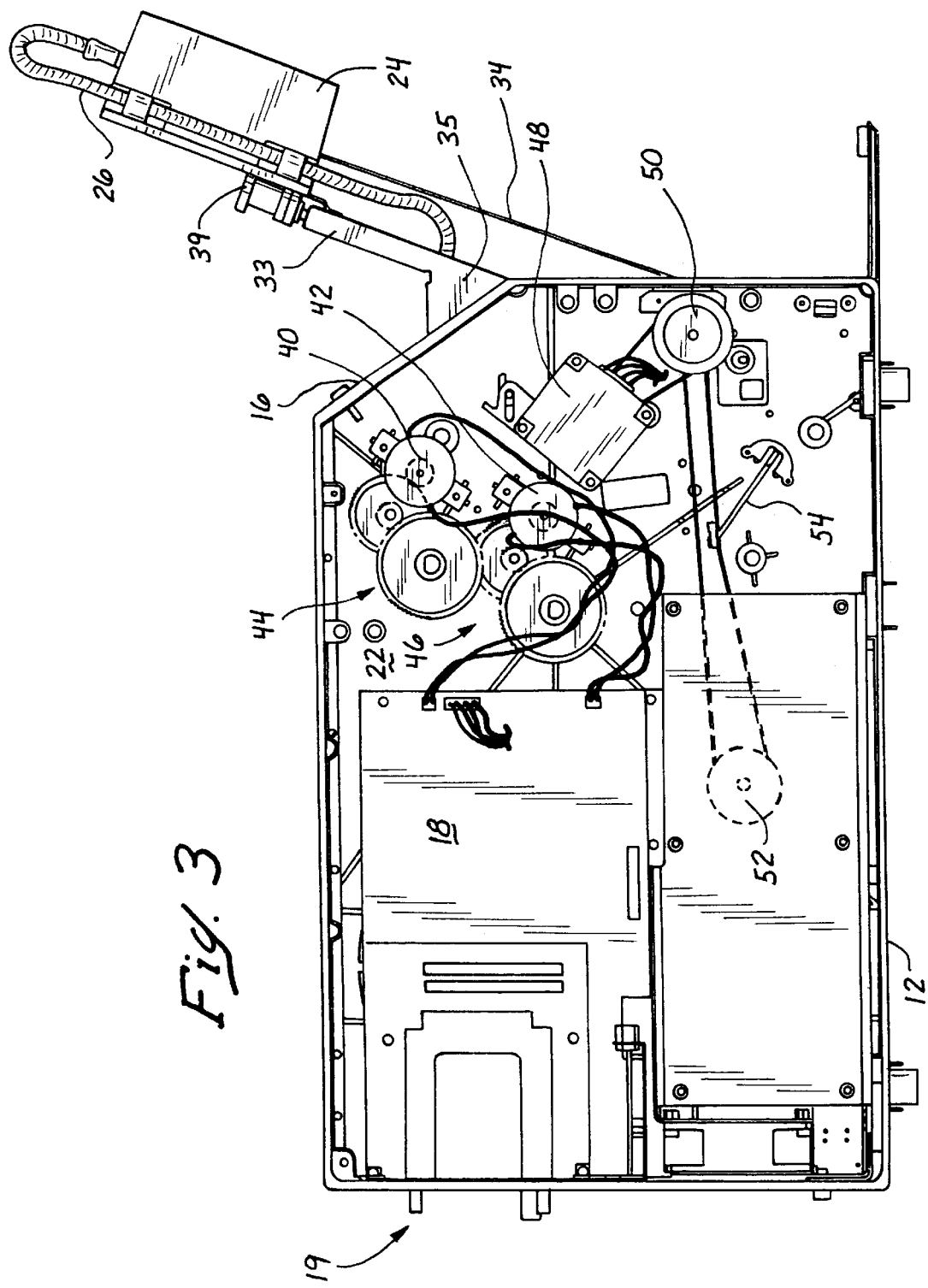
FIG. 3 shows a side elevation view of the printer as shown in FIG. 1.

Looking more specifically at FIG. 3 it can be seen that the controller 18 is shown with number of terminals 19 to which it is connected to the host. In order to drive the printer, a pair of motors 40 and 42 are utilized which drive a respective gear or drive train 44 and 46.

The workings of the motors 40 and 42 as well as the other drive portions of this system can be seen in greater detail in U.S. patent application Ser. No. 09/323,169 as filed May 27, 1999 entitled A Thermal Printer and Drive System, and naming Gordon B. Barrus and Kevin P. Moore as inventors. The application details the drive system of this invention and is incorporated herein by reference.

In order to drive the rotating printing platen, a motor 48 is shown which drives a spindle 50 connected to the platen as well as a media collection spool spindle 52 both connected respectively connected to and driven by belts. In order to tension the belt to the media spool collector, a tensioning spring loaded arm 54 is shown.

Figure 2:
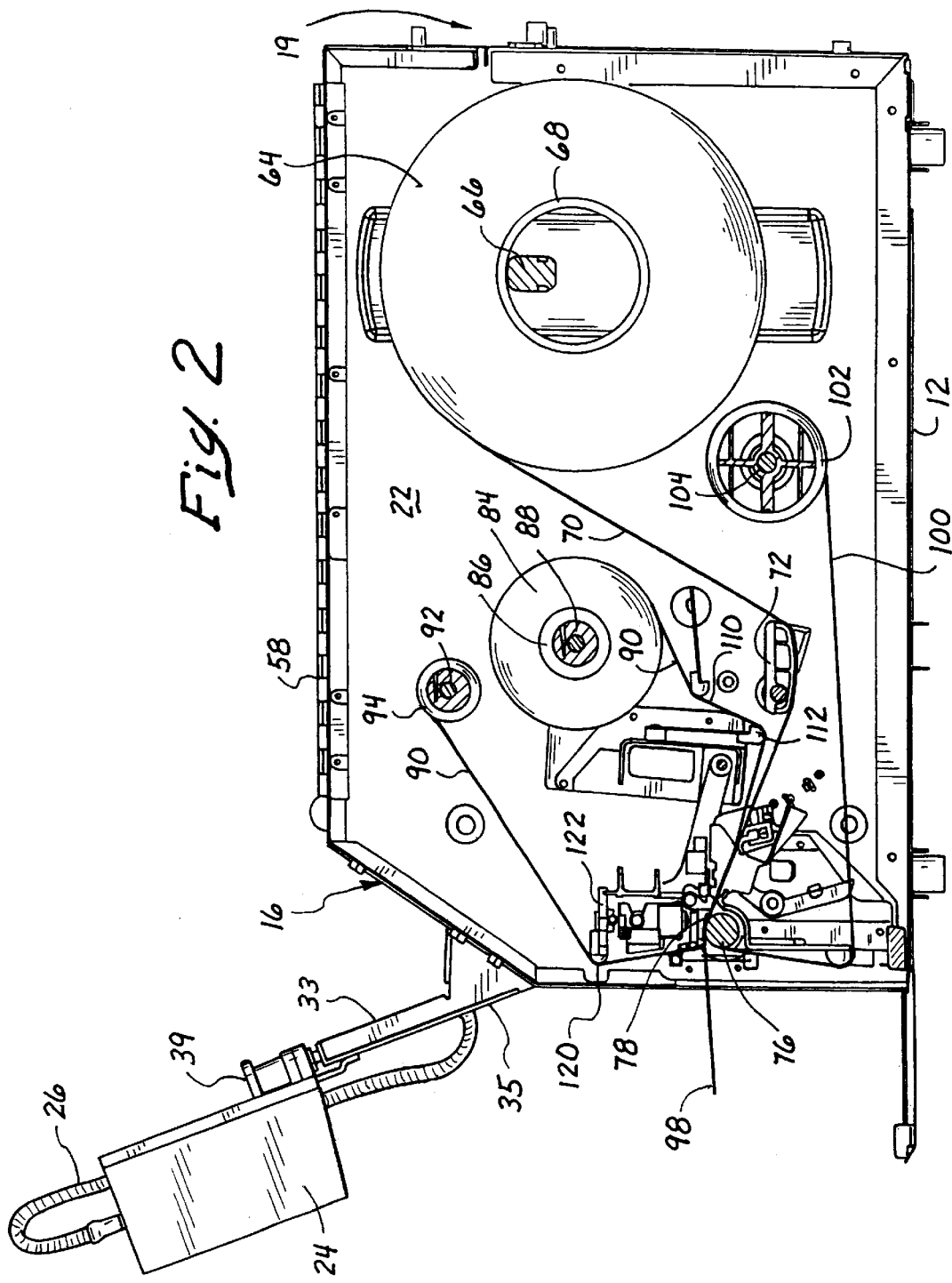
FIG. 2 shows a side elevation view as partially sectioned from the opposite side of FIG. 1.

Looking more particularly at FIG. 2, which is the opposite side of the showings of FIGS. 1 and 3, it can be seen that the casting 22 is shown with a hinged cover 58 and the control panel and display 16. The casting 22 serves to mount the components of both sides of the thermal printer in a rigidified and stable manner.

The media that is to be printed upon, is in the form of a spool of media 64. This spool 64 is shown mounted on an arm 66 to allow it to rotate and be fed off of a cardboard tube 68. The media, has been shown as media 70 being fed off of the spool 64 and can be in the form of paper, plastic, plastic or other labels mounted on an underlying web, or any combination of the foregoing.

The media 70 is driven and pulled over a pivotal arm or elongated foot 72 that provides for tension on the media 70 as it approaches a rotating platen 76 which is driven by the spindle 50. The platen 76 moves with the media 70 with print ribbon thereover for appropriate printing by the thermal print head that is shown herein as thermal print head 78.

The media 70 is printed upon by a thermal print ribbon that can be sensitively emplaced by the heat of the print head 78. In order to provide the print ribbon, a spool 84 of print ribbon is shown connected wound on a cardboard tube 86 that is on a spindle 88 connected to the drive train 46 and motor 42.

Print ribbon 90 is shown being fed off of the spool 84 and collected on a cardboard tube 92 on a spindle 94 that is in turn driven by the gear train 44 connected to motor 40. Here again, the drive of this system is detailed in the thermal printer drive patent application described in U.S. patent application Ser. No. 09/323,169 as filed May 27, 1999 entitled A Thermal Printer and Drive System, and naming Gordon B. Barrus and Kevin P. Moore as inventors.

The print ribbon 90 moves over the print head 78 and prints a label 32 on the media 70 through the thermal printing process by the respective heated pixel locations across the thermal print head 78 which can be upwards of twelve hundred in number. The print head 78 heat is important and relevant to this invention insofar as qualify of print on labels 32 is concerned.

After the media 90 has passed over the print head 78 from the platen 76, labels 32 are provided and the underlying media 100 is fed back onto a spool or cardboard tube 102 on a spindle 104 connected to the media retraction drive sheave or spindle 52 connected in turn to motor 48.

In order to provide for the proper transport of the print ribbon 90, a spring loaded elongated plate 110 is biased upwardly against and across the print ribbon 90 width. The ribbon 90 is then fed over a second downwardly spring biased elongated plate 112 across the width of the ribbon. These elongated spring loaded or biased plates 110 and 112 can be substituted with rollers. Both the plates 110, 112 or rollers can pivot in a gimbaled manner along their longitudinal length so as to provide lateral gimbaled or pivotal support across the width of the print ribbon 90.

The print ribbon 90 after it has left the printing area between the platen 76 and the print head 78 moves upwardly toward a roller 120 or plate that can be a gimbaled roller or plate supported on a gimbal plate 122 that moves pivotally with respect to the width of the print ribbon 90.

The details of the respective movement of the print ribbon 90, media 70 and its respective support and transport is detailed in U.S. Provisional Patent Application Ser. No. 60/136,643 as filed May 27, 1999 entitled A Thermal Printer With Improved Ribbon Transport, naming Dennis R. White as the inventor.

The control of the print head 78 as to heat and various characteristics defines and controls the respective quality of print in some measure. Also, the movement of the media 70 with respect to the print ribbon 90 is a significant factor. Further bearing on the quality of print of label 32 is the nature of the media 70 or print ribbon 90 insofar as any inconsistencies are encountered in the manufacturing process. The quality of the media 70 or the print ribbon 90 or its respective quality as to wrinkles, striations, or imperfections is quite important. The foregoing defects, although found periodically is not always a problem but nevertheless must be accounted for in order to provide for a quality label 32.

Accordingly, this invention undertakes the verification by means of the verifier 24 shown mounted on its bracket 30 to the casting 22 of the thermal printer 10.

Figure 4:
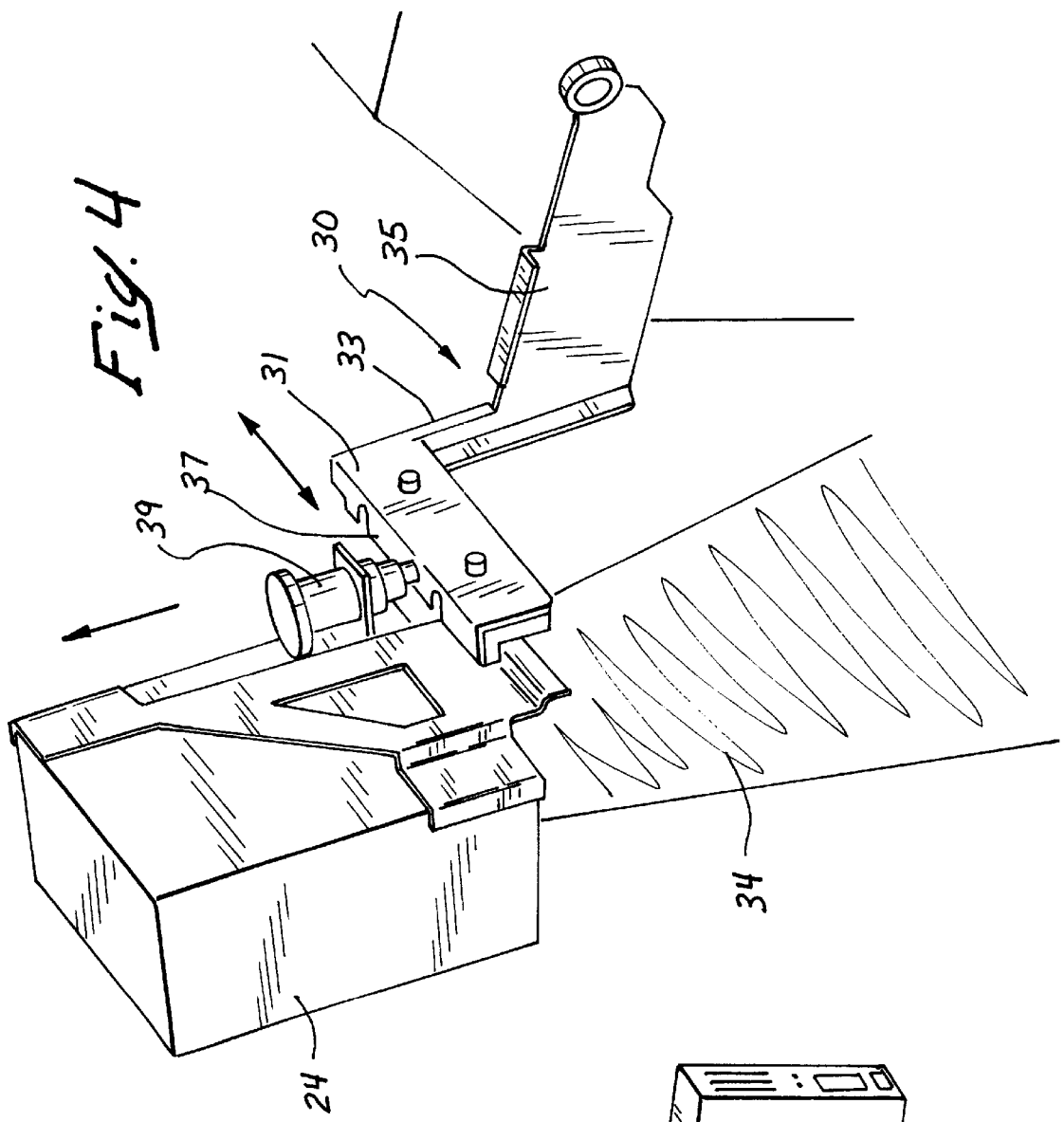
FIG. 4 shows a rear perspective view of the verifier of this invention.
Figure 5:
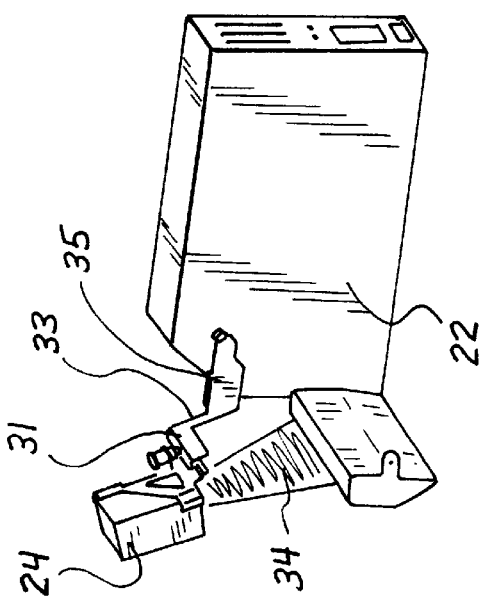
FIG. 5 shows a fragmented small view of the verifier of FIG. 4 as it is mounted on the thermal printer.

Looking more specifically at the verifier 24 and its mounting, it can be seen that the verifier is shown in some detail in FIGS. 4 and 5. In particular, it can be seen that the verifier 24 without its cable is mounted to a bracket 30. The bracket 30 has a lateral portion or horizontal mount 31. The horizontal mount 31 is welded or connected in any suitable manner to the bracket 30 at an upright portion 33 which is in turn connected to a mounting bracket 35. The mounting bracket 35 is bolted or connected by any other suitable means to the cast wall portion 22.

The horizontal portion 31 has a plurality of areas that have been slotted such as slot 37. Slot 37 allows a plunger 39 to be moved upwardly and downwardly to index the verifier 24 along the horizontal bracket 31 so that the scanning beam 34 can move in either direction across the width of the label 32 that has been printed on.

The horizontal bracket 31 is provided with a track so that the verifier 24 can move laterally along its length. The track can be of any suitable type, but in this case is made of a Delrin plastic in order to provide for smooth movement across the length of the bracket 31 so that various widths and orientations of the media can be accommodated so that the beam 34 can scan thereon.

In order to scan a bar code that has been printed, an initial requirement is to make sure that the beam 34 traverses the entire label as seen in FIG. 6. The beam 34 can be varied by various means as to the measurement across the width of the bar code for the label 32 to be printed. In this case in FIG. 6 it can be seen that a label is to be read across the width of approximately six inches on underlying material of 6.8 inches to 8.75 inches.

Looking more particularly at FIG. 7, it can be seen that a quiet zone or non-printed area 140 is shown of one half inch with a plurality of bar codes shown on a label 32 being printed.

In order to verify a proper bar code, a reading of the respective quality is established. This can be first of all a factor of the heat on the print head 78. When looking at FIG. 8, it can be seen that when the print head 78 does not have sufficient heat, that the initial printing is way to low and substantial deviations occur in the bar code elements or lines. A lower print head 78 temperature is also such wherein it does not provide sufficient heating to the print ribbon 90 to allow it to be melted so to speak and applied to the media 70 in a dark and clear manner.

When the print head 78 is at the right temperature, a correct bar code is provided which can also be seen in FIG. 8. When the print head 78 is too hot, it applies too much wax or material from the print ribbon 90. In this case the width of the bar code elements or lines are out of specification with regard to the required protocol. These factors are established by the verifier 24 and relayed to the printer controller 18.

Significantly various elements of the bar code not only as to width are required, but also as to general contrast, width of the quiet zone 140 which must be in many cases at least one half inch, the decodability, and the bar width deviation. In order to establish this criteria, the verifier can determine the picket fence orientation of the bar code, and the respective space between bar codes. Also, the protocols such as those bar code protocols known as code 128, code 39, Codabar, code 93, interleaved 2 of 5, UPC/EAN plus add ons all can be established by the verifier. Any deviation from the norm is then sent to the printer controller 18.

In the eventuality an error is detected, various actions can take place such as those shown in FIG. 9. In FIG. 9, the printer 10 can be stopped because of a poor label number 2 or the second in sequence after label 1. An error message can then be displayed and user intervention can be undertaken such as tearing of the second proposed label.

In the eventuality, that the verifier 24 detects an error in label number 2, i.e. the second label in the overstrike mode, the bad label is marked out. This is by withdrawing the media 70 with the label 32 and the print ribbon 90 backwardly across the print head 78 over the platen 76. In effect the second label after 1 never becomes a usable label and is either removed or struck out. An overstrike then takes place to either hash or completely strike out and blacken the label which would have been number 2. This is performed by the verifier 24 notifying the controller 18 which then commands the respective gear trains 44 and 46 driven by motors 40 and 42 to pull the print ribbon while the motor 48 reverses the media 70 so that an overstrike can be undertaken by the print head 78.

Another option is to reprint label number 2 when the verifier 24 detects an error. In effect the label proposed to be label 2 is reprinted until a proper label 2 is verified. This is done through a number of reprints. A practical upper limit is five reprints to try and produce a correctly verified label in the form of label to be number 2 through the form of withdrawal of the media 70 and print ribbon 90 in the process previously described back across the print head 78 and platen 76.

The quality of the print can also be established by storage in the printer and controller 18 so that the number of forms or bar code labels 32 printed and the quality as to percentage and numbers of poor forms can be displayed on the panel 16 and brought up with any particular menu option for display purposes, or to provide a report. The report can then be printed out or displayed on a remote server or printed on a remote printer. The report can be stored on a separate computer by way of the terminals 19 connected thereto.

A further feature of this invention can incorporate a modification depending upon the menu established on the control panel 16 to create various grading parameters. A feedback to the printer controller 18 can be utilized to reset the printer as to any errors as well as allowing for a stop, a reprint, or an overstrike as previously described. A displayed status of the bar code label 32 failures and remote feedback can be utilized to either speed up or slow down the respective movement of the print ribbon 90 and media 70. At the same time a modification of heat and speed settings on the print head 78 can be effected. The controller 18 when properly modified can establish through a motor feedback to the print head 78 the amount of pressure that is applied through a stepper motor or other means. This feature serves to drive the print head 78 in associated relationship with the platen 76 for greater or lesser pressure as well as changes in the heat required for proper bar code printing.

It should be understood that various modes can be supported by the software in the controller 18. A stop and analysis and report can be utilized when a pre-established minimum quality bar code has been provided. The fault condition of the bar code can be viewed. Once the fault is cleared, the printer 10 can resume normal functions and the message will disappear after the user hits a clear key. Further to this extent, the verification system can be setup and performed through the printer's menu system since the verifier 24 itself has no user accessible adjustments or controls. Such must be established by the printer in a manner whereby settings can be modified locally or in the alternative by a remote network system tied into a system. Any controls should be limited to the amount of speed of printing such that the verifier 24 scan rates are not exceeded.

Another capability with regard to the overstrike as shown in FIG. 9 can be placed within the controller 18 from the panel and the respective menu as well as the ability to reprint.

To the extent that a closed loop system can be utilized to provide an indication of the amount of heat and the heat setting of the print head 78, various inputs can be utilized as well, as previously stated, those with regard to the pressure of the print head and the speed of the media 70 and print ribbon 90.

In order to set the verifier 24 into a proper position, settings are entered by the printer's menu structure on the panel 16. Thereafter, the verifier 24 is positioned for proper angles and width so that the beam 34 covers the appropriate area of a label 32. The verifier 24 is calibrated by placing a reference bar code in the path of the beam 34 at the nominal location of the path until the verifier calibration lamps or other indicia begin to flash.

Various menu modifications can be applied either through inputs through the controller 18 or through menu headings on panel 16 which can include the following: a verifier report; clear data; the number of codes printed; the number of forms printed; the number of bad forms; the average bar width deviations; the last bar width deviation; an enable and disable function; the type and amount of data reported, such as full reports and short reports; the number of codes to be expected for printing; the minimum code gap; the required symbol contrast; a check of the quiet zone; as well as other features.

The printer can operate in multi-modes, some of the more popular ones being a demand load, a peal off mode of the label from the base of the media, and a continuous or tear off strip mode.

When the printer is in the demand mode an extra extended distance might be required before the label can be removed. This is shown in some measure in FIG. 10. In such a case, the bar code label 32 is positioned such that it does not cross the verifier scan line (SCAN) of the beam 34 due to normal printing. Therefor the printer must suppress the cutting procedure until the label is passed or extended sufficiently far out to allow the bar code label 32 to cross the particular scan line. Once the bar code label 32 is properly verified, the printer 10 can then retract the label 32 and cut it and proceed in a normal manner. If the bar code fails, the error handling mode can then be selected such as stop, overstrike, or reprint shown in FIG. 9. The extension requirement is also provided in other non-cutter basic command modes such as in the tear off mode.

In the peal off mode wherein the label 32 is pealed from the underlying media 70, the label cannot be extended an extra distance, since it will be physically removed. Therefor, the bar code must be positioned early enough on the form to fully pass the scan line by the time the label is ready to be removed.

In the modes where several bar codes are to be printed without separating individual bar codes from the label 32, the printer controller 18 does not perform the extra extension of the label. Instead it relies on the fact that more labels 32 that are coming will move out the unverified labels and the printer will continue to monitor the labels in the input buffer. Once printing has stopped and the input buffer is empty, the system will determine if it has received the number of expected verified grades of labels. If not, it will perform an extension and return function similar to that described above with the demand mode.

Some of the above described steps performing the demand mode, peal off mode, and continuous tear off mode verification will slow the printer speed down inasmuch as the slew speed travel must be within the relative speed of the verifier 24. In some cases the form of the bar code can be modified to avoid extra motions and extra extensions to orient the bar codes early enough on the form so they can completely pass the scan line (SCAN). This can entail the movement of the codes to various positions on the form or label 32, or rotating the relative relationship of the respective printing jobs for the bar codes.

As an example, FIG. 11 shows the bar code printing on the right side such where the code is being printed last. In this manner, the printer logic of the controller 18 is able to detect that it has not yet received the verification grade after printing and will extend the printed label 32 out far enough to obtain a scan of the bar code. It then returns the bar code label to the tear bar position to await removal. By rotating the label 180°, the bar code ends up exiting the printer sooner. It is presented to the verifier scan line simply by completing the normal printing of the form and the printer can advance to the tear off bar position without extra extensions and returns.

Certain warnings as to the verifier 24 can be determined by the verifier communicating for instance that it is out of calibration. This can be provided as part of the bar code report or on the panel 16. When such happens, a light on the verifier 24 flashes to the effect that calibration is required and the verifier must be calibrated with a proper bar code.

The verifier 24 optics have an analog range overwhich the proper functioning and acquisition can occur. If the verifier detects that it is operating outside this range it will notify the printer as part of the bar code report. When this occurs, the printer ignores the bar code analysis and enters a false condition. Thereafter printing must stop and a display is provided indicating the verifier 24 failure. Corrective action must then be taken to clear the function and remove the fault condition by providing for the proper range and acquisition.

As stated in the beginning, to properly set the heat of the print head 78 the speed of the media 70 and print ribbon 90 as well as pressure of the print head 78, a user should print a test bar code. This test bar code is then viewed and a reported deviation is established in order to change the print settings. In order to change the print settings, the printer's menus can be utilized or an automatic signal can be provided to change these respective settings.

A motor with a control can drive and change the pressure of the head 78 as well as the spacing of the printer, with the heat being controlled through the controller 18.

The printer can track the position of the last label printed and know when it has completely passed the verifier beam 34. It then compares the number of bar code analyses and reports as to the number received. If there are not sufficient reports it enters an error condition. The bar code can then be detected which is so poor that it can not be read.

Various methods including the stop, overstrike, and reprint method can be utilized such as described in FIG. 9. In conjunction with this, the analysis and report is provided to give the appropriate fail and respective rates as to each of the foregoing. To this extent, the input can be through operator intervention when a warning is provided so that the operator can then take action through the panel 16. In the alternative a pre-established program can be provided to the controller 18 in its memory so that a respective function will take place to provide the overstrike or the reprint. Obviously, the stop position requires operator intervention in order to start the process of printing again.

Various error messages and reported failures can be provided. Each defines a type of problem encountered with the bar code.

A decodability failure indicates that the difference between the wide and narrow elements is too close for reliable discernment and reading. This can be an indication of improperly set heat for the print head 78, the speed of the respective drives moving the print ribbon 90 and the media 70, the pressure on the print head 78, and in the alternative a loss of a heating element among the many pixels provided by the print head.

A defect failure is such where unexpected dark spots or spaces or light spots appear in bars. This is generally an indication of a poor ribbon 90 and media 70 combination as well as the head 78 needing cleaning or a burned pixel.

A percent of decode failure is a measure of consistency throughout the height of the bar code which indicates the number of scans that were good as a percentage of the total scanned. Failures in this case are likely to be attributed to large blemishes within the code such as by a wrinkle.

A quiet zone failure indicates that the minimum blank zone surrounding the bar code has not been established. This can occur through poorly designed bar codes and forms that are placed too close together, or the bar code can be too close to an edge of the media 70, or the media's position is shifting.

A symbol contrast failure is when the bars and spaces are not sufficient. This can be due to excessively light printing from a depleted ribbon 90 or too little heat on the thermal head 78.

Encodation failure occurs when the bar code is not properly encoded. For example a sum is incorrect, a required number of characters is not met or required terminator characters are not included. In almost all these cases this is an indication of a poor bar code form or improper aspects of the host and application design.

Generally, the user can take corrective action with regard to the foregoing when such a message is displayed. The corrective action to improve the bar code quality is such wherein priorities as to subtle failure modes and more severe failure modes are cured in a manner of the priority thereof. The hierarchy of priorities can be, but not mandatory; 1) encodation failure; 2) quiet zone failure; 3) symbol contrasts; 4) percent decode; 5) defects failure; 6) decodability failure; and, 7) a missing report. Also depending upon printing requirements, a defect failure can assume any one of the foregoing rankings of hierarchy.

All the foregoing fault conditions can be addressed through the printer panel 16 and cured by an operator's intervention. However, as previously stated other methods can be utilized to provide feedback of the respective corrective actions to control the elements of proper bar code printing through servo motors, stepper motors, controllers and other known drives and controllers to move and actuate the respective elements of the thermal printer to provide for a proper bar code printing. The movement of the print ribbon 90, media 70, and other elements as well as the proper control can be undertaken through the combined control and drive as well as ribbon transport as seen in U.S. patent application Ser. No. 09/323,169 and U.S. Provisional Patent Application Ser. No. 60/136,643.

From the foregoing it can be seen that this invention is a significant step over the art with regard to verifying bar codes and it should be read broadly.

What is claimed is:

1. A printer connected to a print quality verifier comprising:

a printer having printing elements for printing on a media;

means for supplying media to be printed upon by said printer;

a verifier connected to said printer for verifying the quality of print on said media;

a controller in said printer for receiving data from said verifier to provide a signal for corrective quality control of said printer; and, wherein said verifier verifies the quality of a bar code as printed as to two or more criteria selected from the group consisting of encodation failure, quiet zone failure, symbol contrasts, percent decode, defects failure, decodability failure, or a missing report pertaining to said printer output.

2. A printer as claimed in claim 1 further comprising:

a program of said controller connected to a display for displaying the quality of print as verified.

3. A printer as claimed in claim 1 further comprising:

a program of said controller connected to said printer controls for changing the functions of said printer.

4. A printer as claimed in claim 1 further comprising:

said printer having a bar code printing capability.

5. A printer as claimed in claim 1 wherein:

said printer is a thermal printer.

6. A printer as claimed in claim 1 wherein:

said printer is a line matrix printer.

7. A printer as claimed in claim 1 wherein:

said printer is a laser printer.

8. A printer as claimed in claim 4 wherein:

said printer is a thermal printer.

9. A thermal printer and print verifier comprising:

a thermal printer having a drive for a print ribbon and media for printing upon for moving said print ribbon and media over a thermal printing head;

a controller in said printer for controlling the movement of said print ribbon and media, and the heat and pressure of said thermal printing head;

a verifier positioned with respect to media being printed by said printer to verify criteria of the printing on said media, said verifier connected to said controller to provide information to said controller for controlling the functions of said printer; and, said controller can cause a label to be drawn back into said printer for cutting after verification.

10. The printer as claimed in claim 9 wherein:

said controller controls said drive for the print ribbon and media.

11. The printer as claimed in claim 9 wherein:

said controller controls the heat of the thermal printer head.

12. The printer as claimed in claim 9 wherein:

said printer has an operator control panel to provide input to said controller based upon verifier information.

13. The printer as claimed in claim 9 wherein:

said controller can control said printer based upon verifier information to stop printing, overstrike a printed label, or reprint a label.

14. The printer as claimed in claim 9 wherein:

said controller can control said printer to cut a label after verification.

15. The printer as claimed in claim 14 wherein:

said controller can cause a label to be drawn back into said printer for cutting after verification.

16. The printer as claimed in claim 9 wherein:

said verifier can establish relative darkness or lightness of bar code print; and, further comprising a connection to said controller to change the relative amount of heat on said thermal printer head with respect to tonal criteria.

17. A thermal printer and verifier system comprising:

a drive for the supply of print ribbon;

a drive for the supply of print media;

a thermal printer head overwhich said media and ribbon can pass against a platen;

a controller for said printer;

a verifier connected to said controller and positioned to scan the media after printing to provide output signals to said controller for printer control; and, wherein said controller based upon output signals from said verifier can provide signals to indicate the desired calibration of said verifier as to bar codes.

18. The thermal printer and verifier system as claimed in claim 17 wherein:

said controller based upon output signals from said verifier can provide heat settings of said thermal printer head.

19. The thermal printer and verifier system as claimed in claim 17 wherein:

said controller based upon output signals from said verifier can provide variable speeds of printing for said printer.

20. The thermal printer and verifier system as claimed in claim 17 wherein:

said controller based upon output signals from said verifier can provide variations in the speed of print ribbon and the speed of media to be printed upon.

21. The thermal printer and verifier system as claimed in claim 17 wherein:

said controller based upon output signals from said verifier can provide variable pressures of said printer head on said media and print ribbon.

22. The thermal printer and verifier system as claimed in claim 17 wherein:

said controller based upon output signals from said verifier can change the space of printing by said printer.

23. The thermal printer and verifier system as claimed in claim 17 further comprising:

a control panel connected to said printer controller for modifying said printer functions.

24. The thermal printer and verifier system as claimed in claim 23 further comprising:

a menu selection and display panel and program for displaying said printer functions for modifying them by an operator.

25. A method for printing and verifying the quality of print comprising:

providing a printer having printing elements for printing on a moving media;

providing a source of media in said printer for printing upon;

printing a desired print configuration on said media;

verifying the quality of print on said media; controlling said printer based upon the verifying of print; and, controlling said printer by a controller after verifying print criteria for purposes of correcting two or more criteria selected from the group consisting of encodation failure, quiet zone failure, symbol contrasts, percent decode, defects failure, decodability failure, and picket fence orientation of bar code.

26. The method as claimed in claim 25 further comprising:

displaying information by said printer based upon the verification of print quality.

27. The method as claimed in claim 25 further comprising:

providing a controller in said printer; and, controlling said printer based upon the verified print through said controller.

28. The method as claimed in claim 25 further comprising:

providing a bar code through the printing of said printer.

29. The method as claimed in claim 25 wherein:

said printer is a thermal printer.

30. The method as claimed in claim 25 wherein:

said printer is a line matrix printer.

31. The method as claimed in claim 29 wherein:

said printer is a thermal printer.

* * * * *